United States Patent [19]
Aryee

[11] Patent Number: 5,212,333
[45] Date of Patent: May 18, 1993

[54] MUSICAL BATON APPARATUS

[76] Inventor: Frederick O. Aryee, 3790 32nd St., Apt. E., San Diego, Calif. 92104

[21] Appl. No.: 835,316

[22] Filed: Feb. 14, 1992

[51] Int. Cl.⁵ .................. G09B 15/02; A45B 3/02
[52] U.S. Cl. .................... 84/477 B; 362/102
[58] Field of Search ............ 84/477 R, 477 B, 464 R; 362/102

[56] References Cited

U.S. PATENT DOCUMENTS

| | | | |
|---|---|---|---|
| 4,600,974 | 7/1986 | Lew et al. | 362/102 |
| 4,967,321 | 10/1990 | Cimock | 362/102 |
| 5,036,442 | 7/1991 | Brown | 362/102 |
| 5,081,568 | 1/1992 | Dong et al. | 362/102 |
| 5,105,309 | 4/1992 | Baravaglio et al. | 362/102 |

Primary Examiner—Michael L. Gellner
Assistant Examiner—Spyrou Cassandra
Attorney, Agent, or Firm—Leon Gilden

[57] ABSTRACT

A musical baton is arranged to include an illumination source therewithin projecting into a translucent rod extending from the baton, with the translucent rod arranged to receive illumination from the handle portion of the baton structure, with the illumination projected through one of a plurality of contrastingly colored lenses to alter illumination within the baton structure during use.

5 Claims, 4 Drawing Sheets

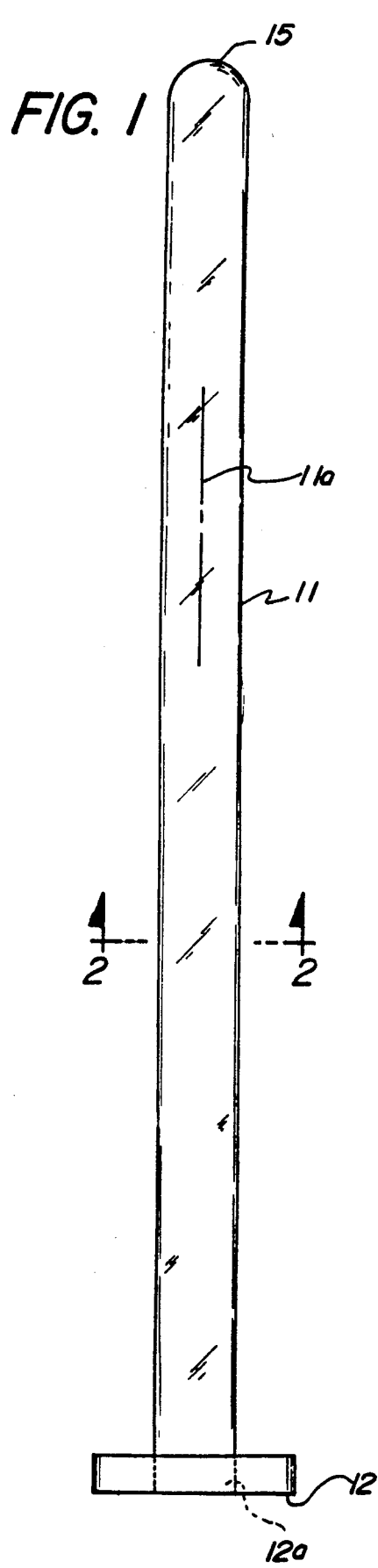
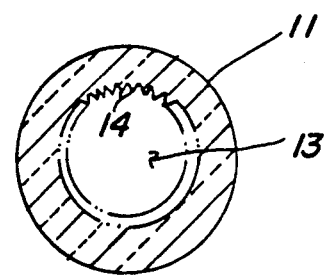
FIG. 1
FIG. 2

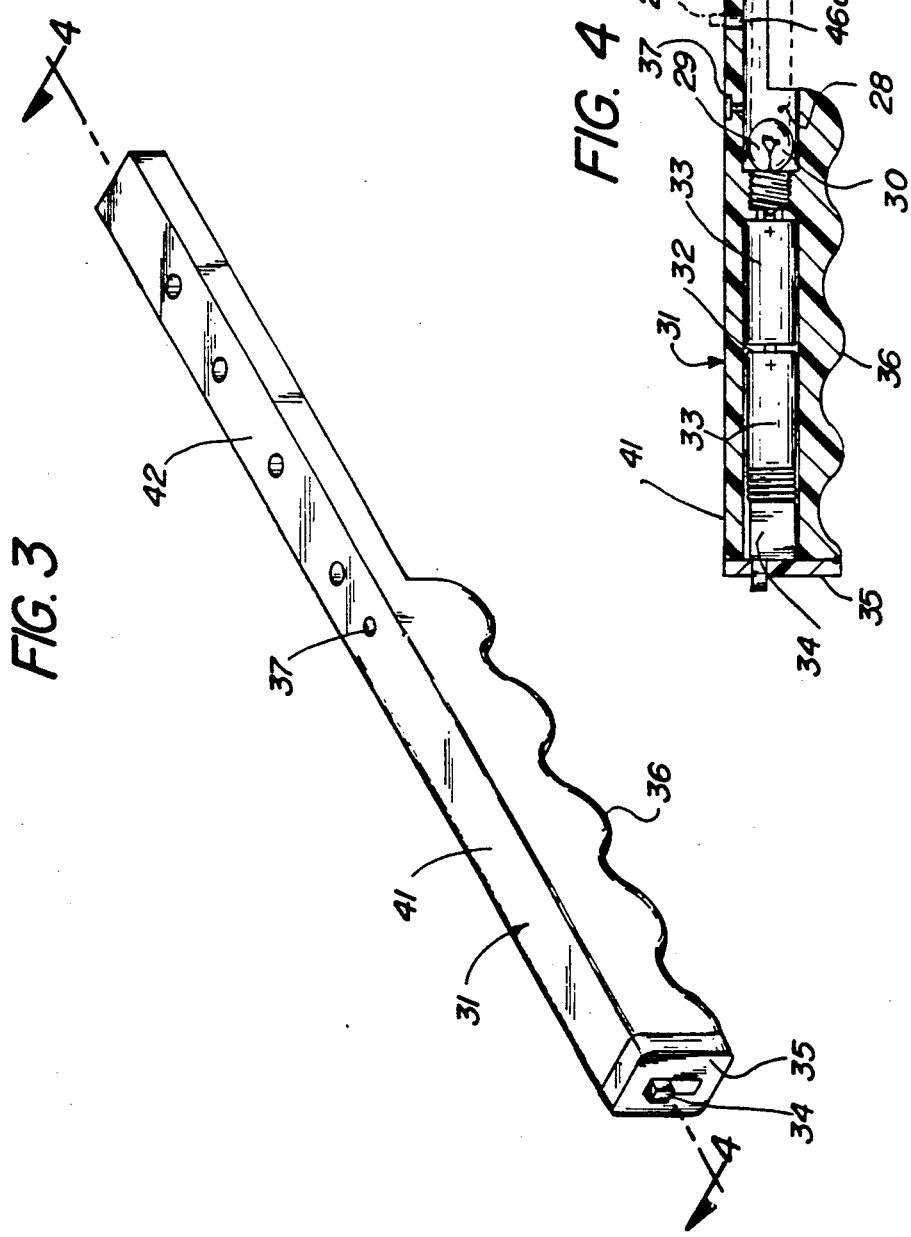

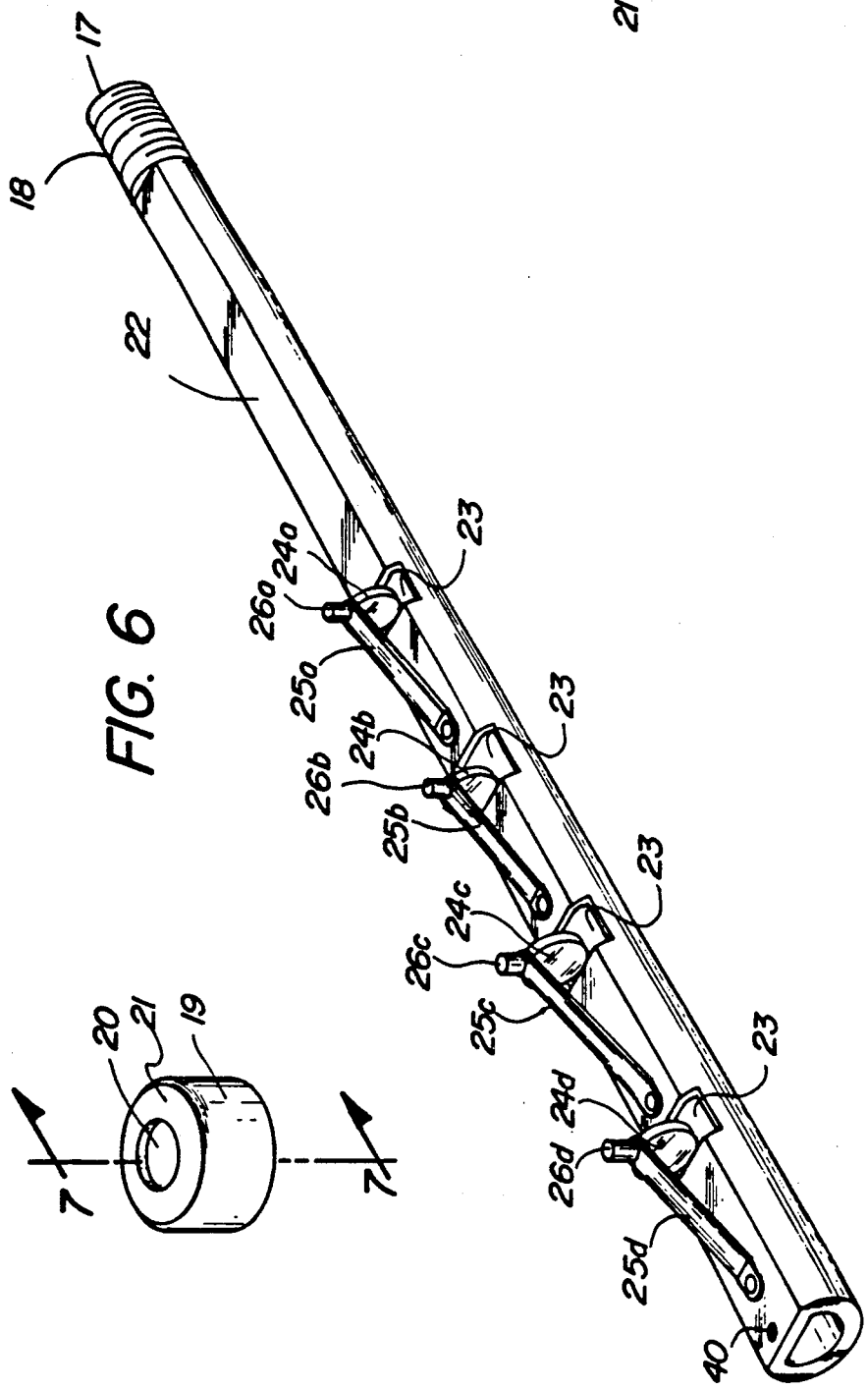
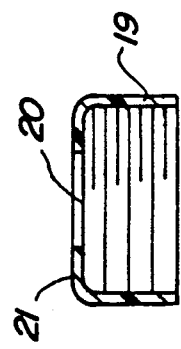

MUSICAL BATON APPARATUS

BACKGROUND OF THE INVENTION

1. Field of the Invention

The field of invention relates to musical baton apparatus, and more particularly pertains to a new and improved musical baton apparatus wherein the same is arranged to effect selective illumination of a forwardly directed rod for instructional use during musical conducting by an individual.

2. Description of the Prior Art

Various constructions are effected by a conductor of music to include such directions as "start playing", "play high", "stop playing", and "play low". The instant invention attempts to address deficiencies of the prior art by effecting illumination selectively of the baton in association with various constructions in musical conducting. A prior art illuminated drumstick or baton is set forth in the U.S. Pat. No. 4,106,079 to Drury wherein the drumstick is constructed of a transparent material, including a suitable chemiluminscent material. The baton structure is merely arranged to effect luminescent illumination of the baton structure.

Further baton structure is set forth in U.S. Pat. Nos. 4,842,277; 4,434,697; and 4,890,203.

Accordingly, it may be appreciated that there continues to be a need for a new and improved musical baton apparatus as set forth by the instant invention which addresses both the problems of ease of use as well as effectiveness in construction in providing selective illumination of various colorations in a baton structure and in this respect, the present invention substantially fulfills this need.

SUMMARY OF THE INVENTION

In view of the foregoing disadvantages inherent in the known types of musical baton apparatus now present in the prior art, the present invention provides a musical baton apparatus wherein the same utilizes selective illumination of various colorations, wherein each coloration is associated with a various and discrete musical command in a musical conducting situation. As such, the general purpose of the present invention, which will be described subsequently in greater detail, is to provide a new and improved musical baton apparatus which has all the advantages of the prior art musical baton apparatus and none of the disadvantages.

To attain this, the present invention provides a musical baton arranged to include an illumination source therewithin projecting into a translucent rod extending from the baton, with the translucent rod arranged to receive illumination from the handle portion of the baton structure, with the illumination projected through one of a plurality of contrastingly colored lenses to alter illumination within the baton structure during use.

My invention resides not in any one of these features per se. but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved musical baton apparatus which has all the advantages of the prior art musical baton apparatus and none of the disadvantages.

It is another object of the present invention to provide a new and improved musical baton apparatus which may be easily and efficiently manufactured and marketed.

It is a further object of the present invention to provide a new and improved musical baton apparatus which is of a durable and reliable construction.

An even further object of the present invention is to provide a new and improved musical baton apparatus which is susceptible of a low cost of manufacture with regard to both materials and labor, and which accordingly is then susceptible of low prices of sale to the consuming public, thereby making such musical baton apparatus economically available to the buying public.

Still yet another object of the present invention is to provide a new and improved musical baton apparatus which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is an orthographic top view of the tubular wand portion of the invention.

FIG. 2 is an orthographic view, taken along the lines 2—2 of FIG. 1 in the direction indicated by the arrows.

FIG. 3 is an isometric illustration of the handle portion of the invention.

FIG. 4 is an orthographic view, taken along the lines 4—4 of FIG. 3 in the direction indicated by the arrows.

FIG. 5 is an isometric illustration of the securement cap securing the tubular wand to the wand support tube.

FIG. 6 is an isometric illustration of the wand support tube.

FIG. 7 is an orthographic view, taken along the lines 7—7 of FIG. 5 in the direction indicated by the arrows.

DESCRIPTION OF THE PREFERRED EMBODIMENT

Figure 8:
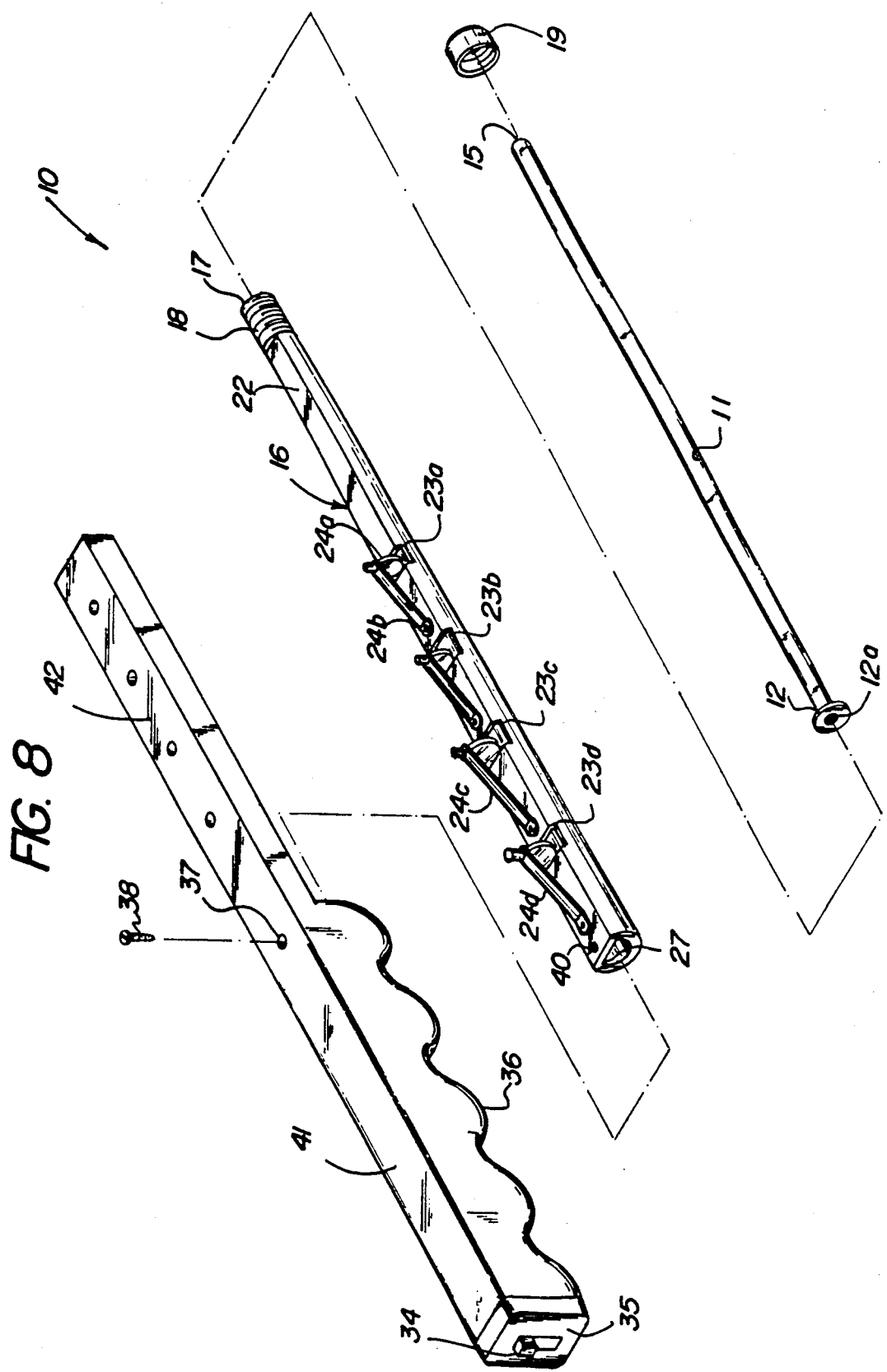
FIG. 8 is an isometric illustration of the invention in a exploded configuration to illustrate the various components and their inter-relationship.

With reference now to the drawings, and in particular to FIGS. 1 to 8 thereof, a new and improved musical baton apparatus embodying the principles and concepts of the present invention and generally designated by the reference numeral 10 will be described.

More specifically, the musical baton apparatus 10, such as illustrated in FIG. 8, includes a translucent tubular wand 11 mounted to a forward distal end of a wand support tube 16 in a coaxially aligned relationship. The rear end portion of the wand support tube 16 is mounted within a handle body 31 in a longitudinally aligned relationship. The translucent tubular wand 11 is defined about an axis 11a, including a wand rear wall flange 12 formed with a flange plate bore 12a coaxially aligned with a wand elongate cavity 13 within the tubular wand 11. The rear wall plate flange 12 extends laterally beyond the rear distal end of the wand 11, in a manner as illustrated in the FIGS. 1 and 8 for example. A wand front wall 15 effects closure of the wand, and the wand cavity 13 is formed with a series of parallel flutes 14 arranged coextensively about an interior wall of the elongate cavity 13, wherein the flutes 14 (see FIG. 2 for example) are oriented parallel relative to the axis 11a. The wand 11 is mounted in a coaxially aligned relationship relative to the wand support tube 16, and more specifically to a wand support tube forward end 17. The tube threaded forward outer wall portion 18 cooperates with an internally threaded cap 19. The internally threaded cap 19 includes a cap bore 20 (see FIG. 5), with the cap bore 20 receiving the wand 11 therethrough. The cap 19 further includes a cap torroidal top wall 21 formed about the cap bore 20, wherein the cap top wall 21 is arranged in abutment and in reception of the wand rear wall flange plate 12. In this manner, the cap threadedly secured to the support tube threaded forward outer wall 18 longitudinally aligns and secures the wand 11 to the forward distal end of the wand support tube 16. The wand support tube 16 is formed of an opaque material and includes a planar top wall 22, including a plurality of parallel top wall slots defined by a respective first, second, third, and fourth top wall slot 23a, 23b, 23c, and 23d respectively spaced apart a predetermined spacing. A respective first, second, third, and fourth lens 24a, 24b, 24c, and 24d respectively are positioned above each slot orthogonally oriented relative to the planar top wall 22. Each lens of the lenses 24a-24d includes a respective first, second, third, and fourth spring leg 25a, 25b, 25c, and 25d. Each spring leg is mounted to an upper end of the respective lens positioned above a respective slot, with a lower distal end of each spring leg mounted to the support tube planar top wall 22. A respective first, second, third, and fourth cylindrical projecting lug 26a that are spaced apart a predetermined spacing are diametrically aligned with each lens and mounted to the respective first through fourth spring legs at their upper distal ends. The support tube rear end 27 is received within a handle socket 28 of a handle body 31 (see FIG. 4). The handle socket 28 includes a handle socket rear wall 29 receiving an abutment and the support tube rear end 27. An illumination bulb 30 is received within the rear wall 29 and a plurality of batteries 33 positioned within a handle body cavity 32 within the handle body 31 are in electrical communication with the illumination bulb 30 through an associated handle switch 34 mounted to the handle rear end wall 35. Actuation of the handle switch 34 effects illumination of the illumination bulb 30. The handle body 31 includes an undulating bottom wall 36 to enhance ease of grasping of the organization. A handle socket intersecting fastener bore 37 is directed into the handle socket 28 through the handle body top wall 41. A fastener 38 is directed through the fastener bore 37 and received within a support tube fastener receiving bore 40 when the support tube rear end 27 is positioned in abutment with the handle socket rear wall 29. A handle body top wall flange 42 defined by a C-shaped cross-sectional configuration is coplanar with the handle body top wall 41 extending forwardly thereof in a longitudinally aligned relationship, wherein a top wall flange channel 44 defined by the C-shaped cross-sectional configuration receives the support tube, and more specifically, the support tube planar top wall 22 in contiguous communication with the bottom surface of the handle body top wall flange 42. Accordingly, a first through fourth flange bore 46a, 46b, 46c, and 46d (see FIG. 4) with each flange bore spaced apart the aforenoted predetermined spacing receives an associated first through fourth cylindrical projecting lug 26a through 26d of the wand support tube 16 therethrough. In this manner, an individual manually manipulating the handle body 31 merely depresses a first through fourth projection lug 26a to project an associated first through fourth lens 24a through 24d into its associated slot. The lenses 24a through 24d are of contrasting colorations, whereupon illumination from the illumination bulb is directed through the wand support tube 22 into the translucent tubular wand 11 and colored by the respective first through fourth lens 24a through 24d to accordingly effect varying coloration directed into the wand elongate cavity 13. The parallel flutes 14 provide for a surface area within the elongate cavity 13 to provide for enhanced illuminating surface to be directed through the translucent wand 11 providing for a prismatic effect to enhance such illumination directed through the wand. In this manner, a conductor utilizing the wand may thereby direct varying signals to a musical orchestra in association with the various colorations of the lenses 24a through 24d.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A musical baton apparatus, comprising, an elongate handle body, the handle body including a handle socket, and a wand support tube, the wand support tube including a support tube rear end, with the support tube rear end received within the handle socket and longitudinally aligned relative to the handle body, and the wand support tube including a translucent tubular wand mounted in a longitudinally aligned relationship relative to the wand support tube at a forward distal end of the wand support tube, and illumination means mounted within the handle body for projecting illumination through the wand support tube into the translucent tubular wand, and illumination control means mounted to the wand support tube and arranged for manual manipulation relative to the handle body and oriented for projecting various colorations of illumination into the tubular wand, and the translucent tubular wand includes a wand rear wall flange plate, the rear wall flange plate extends laterally and orthogonally beyond the tubular wand, and the wand rear wall flange plate including a flange plate bore directed therethrough, and the translucent tubular wand including an elongate cavity directed through the tubular wand coextensively therewith in communication with the flange plate bore, and a plurality of parallel flutes arranged coextensively within the tubular wand, with the tubular wand oriented about a wand axis and the flutes oriented parallel relative to the wand axis, and the wand support tube including an externally threaded forward outer wall portion, and an internally threaded cap formed with a cap bore receiving the wand therethrough, the cap including a cap top wall, the cap top wall in abutment with the wand rear wall flange plate received within the cap, and the cap threadedly secured to the wand support tube threaded forward outer wall portion to longitudinally align the translucent tubular wand relative to the wand support tube.

2. An apparatus as set forth in claim 1 wherein the wand support tube is formed of an opaque material, with a wand support tube through-extending bore directed coextensively through the wand support tube, and the wand support tube including a planar top wall, the planar top wall including a plurality of top wall slots spaced apart a predetermined spacing, and a plurality of contrastingly colored lens members, with one of said lens members mounted for sliding reception within one of said slots, with each lens member oriented orthogonally relative to the wand axis, and each lens including a spring leg, the spring leg directed downwardly and mounted to the support tube planar top wall, and each spring leg including a cylindrical projecting lug mounted to the spring leg, with the projecting lugs spaced apart the predetermined spacing, and the handle body including a handle body planar top wall, and a handle body top wall flange coplanar with the handle body top wall extending forwardly of the handle body, with the handle body top wall flange including a plurality of flange bores, with the flange bores spaced apart the predetermined spacing, with each flange bore receiving a cylindrical projecting lug therethrough to permit manual depressing of said cylindrical projecting lug for projecting a respective lens of the plurality of lenses through a respective slot of said plurality of slots.

3. An apparatus as set forth in claim 2 wherein the illumination means includes an illumination bulb mounted within the handle socket, and the handle body including a handle body cavity, including at least one battery member contained therewithin, and a handle switch mounted to the handle body for effecting selective illumination of the illumination bulb, with the illumination bulb arranged in alignment with the support tube for directing illumination through the support tube into the translucent tubular wand, wherein the illumination control means comprises the plurality of cylindrical projecting lugs directed through the plurality of flange bores.

4. An apparatus as set forth in claim 3 wherein the handle body top wall includes a fastener bore, the fastener bore directed into the handle socket, and the wand support tube planar top wall including a fastener receiving bore, and a fastener directed through the handle socket intersecting fastener bore into the fastener receiving bore.

5. An apparatus as set forth in claim 4 wherein the handle body top wall flange is formed of a C-shaped cross-sectional configuration defining a flange handle therewithin, wherein the wand support tube is received within the top wall flange channel, and the wand support tube planar top wall spaced from the handle body top wall flange to project the cylindrical projecting lugs through the flange bores.

* * * * *